Patented Dec. 28, 1926.

1,612,672

UNITED STATES PATENT OFFICE.

FERNANDO SOMOZA VIVAS, OF LOS ANGELES, CALIFORNIA.

FIREPROOF STRUCTURAL PAINT.

No Drawing. Application filed June 14, 1923, Serial No. 645,343. Renewed May 26, 1926.

The invention relates to paints and has as an object the provision of a paint especially adapted for use upon steel and iron work which shall be fireproof and resistant to acid and alkaline fumes.

A further object of the invention is the provision of a structural fireproof paint which shall be inexpensive to manufacture.

The ingredients with their proportions which it is preferred to use as a physical embodiment of the invention are set forth in the following formula:

| | Parts |
|---|---|
| Fireproof Chinese wood oil | 3 |
| Ester gum | 2 |
| Thinner | 1 |
| Zinc oxide | 2 |
| Powdered silica | 1.5 |
| Zinc stearate | .3 |
| Coloring matter | .2 |

The formula above given specifies Chinese wood oil or tung oil for the reason that a paint made with this oil instead of with linseed oil is found to be more resistant to acid and alkali fumes. For the same reason zinc oxide is specified. It will be understood that linseed oil may be used to replace the Chinese wood oil named and that white lead may be substituted for some or all of the zinc oxide without departing from the spirit of the invention and without destroying the fireproof properties of the paint.

The fireproof Chinese wood oil named in the above formula may be the oil which is described in my co-pending application for patent, Serial No. 645,342, filed June 14, 1923, and has a preferred formula as follows:

| | Parts |
|---|---|
| Chinese wood oil | 60 |
| Borax | 10 |
| Potash alum | 10 |
| Ammonium chloride | 10 |
| Boric acid | 5 |
| Tungstate of soda | 5 |

The thinner named in the formula is made the subject matter of a separate application, Serial No. 645,346, filed June 14, 1923, and comprises the following formula:

| | Parts |
|---|---|
| "Nearturps" | 40 |
| Turpentine | 10 |
| Zinc sulphate | 5 |
| Hexachlorethane | 1 |
| Drying oil | 4 |
| Carbon tetrachloride | 40 |

The "ester gum" mentioned in the first formula given is a well known form of synthetic gum and is manufactured from rosin, lime and glycerine. The "Nearturps" in the above formula is a gasoline produced by straight distillation, as distinguished from cracking, and which has been deodorized by treatment with alcohol. Other turpentine substitutes may be utilized in lieu thereof.

Minor changes may be made in the proportion of parts or known equivalents may be substituted for some of the ingredients named without departing from the spirit of the invention.

I claim:

1. A fireproof structural paint, comprising, in combination, a fireproof paint oil, an ester gum, a thinner, a pigment, silica, and zinc stearate in proportions to produce a fireproof paint.

2. A fireproof structural paint, comprising, in combination, fireproof Chinese wood oil, an ester gum, a thinner, zinc oxide, powdered silica and zinc stearate in proportions to produce a fireproof paint.

3. A fireproof structural paint, comprising, in combination, fireproof Chinese wood oil, ester gum, a fireproof thinner, zinc oxide, powdered silica, zinc stearate and coloring matter, in proportions to produce a fireproof paint.

4. A fireproof structural paint comprising, in combination, fireproof Chinese wood oil 3 parts, ester gum 2 parts, thinner 1 part, zinc oxide 2 parts, powdered silica 1.5 parts, zinc stearate .3 parts, coloring matter .2 parts.

FERNANDO SOMOZA VIVAS.